United States Patent
Alon et al.

(10) Patent No.: US 11,423,273 B2
(45) Date of Patent: Aug. 23, 2022

(54) DETECTION OF MACHINE-READABLE TAGS WITH HIGH RESOLUTION USING MOSAIC IMAGE SENSORS

(71) Applicant: Sodyo Ltd., Binyamina (IL)

(72) Inventors: Alex Alon, Binyamina (IL); Irina Alon, Binyamina (IL)

(73) Assignee: SODYO LTD., Binyamina (IL)

( * ) Notice: Subject to any disclaimer, the term of this patent is extended or adjusted under 35 U.S.C. 154(b) by 0 days.

(21) Appl. No.: 17/254,280

(22) PCT Filed: Jul. 7, 2019

(86) PCT No.: PCT/IB2019/055774
§ 371 (c)(1),
(2) Date: Dec. 20, 2020

(87) PCT Pub. No.: WO2020/012316
PCT Pub. Date: Jan. 16, 2020

(65) Prior Publication Data
US 2021/0248436 A1   Aug. 12, 2021

Related U.S. Application Data

(60) Provisional application No. 62/696,363, filed on Jul. 11, 2018.

(51) Int. Cl.
G06K 19/06 (2006.01)
G06T 3/40 (2006.01)
G06K 7/14 (2006.01)

(52) U.S. Cl.
CPC ...... *G06K 19/06037* (2013.01); *G06T 3/4015* (2013.01); *G06K 7/1413* (2013.01); *G06K 7/1417* (2013.01)

(58) Field of Classification Search
CPC .......... G06K 19/06037; G06K 7/1413; G06K 7/1417; G06T 3/4015
See application file for complete search history.

(56) References Cited

U.S. PATENT DOCUMENTS 3,971,065 A   7/1976 Bayer
4,697,208 A   9/1987 Eino
(Continued)

FOREIGN PATENT DOCUMENTS

EP   1870858 A2   12/2007
EP   2068117 A2   6/2009
(Continued)

OTHER PUBLICATIONS

International Application # PCT/IB2019/055774 Search report dated Oct. 31, 2019.
(Continued)

*Primary Examiner* — Laura A Gudorf
(74) *Attorney, Agent, or Firm* — Kligler & Associates Patent Attorneys Ltd

(57) ABSTRACT

Imaging apparatus (28) includes a mosaic image sensor (38), which is configured to capture and output a mosaic image comprising a matrix of pixels that is made up of multiple interleaved sub-matrices, each sub-matrix containing the pixels of a single respective color. Processing circuitry (32) is configured to process the pixels in each of one or more of the sub-matrices separately from the pixels in the other sub-matrices in order to identify in the mosaic image a graphical tag (22) that encodes a digital value in a machine-readable form.

21 Claims, 8 Drawing Sheets

(56) References Cited

U.S. PATENT DOCUMENTS

| | | |
|---|---|---|
| 5,576,528 A | 11/1996 | Chew et al. |
| 5,726,435 A | 3/1998 | Hara et al. |
| 5,869,828 A | 2/1999 | Braginsky |
| 6,070,805 A | 6/2000 | Kaufman et al. |
| 7,020,327 B2 | 3/2006 | Tack Don et al. |
| 7,243,024 B2 | 7/2007 | Endicott |
| 7,505,849 B2 | 3/2009 | Saarikivi |
| 7,511,736 B2 | 3/2009 | Benton |
| 7,516,421 B2 | 7/2009 | Asano et al. |
| 7,619,990 B2 | 11/2009 | Alicherry et al. |
| 7,936,901 B2 | 5/2011 | Jancke |
| 9,437,046 B2 | 9/2016 | Alon et al. |
| 9,818,229 B2 | 11/2017 | Alon et al. |
| 10,147,214 B2 | 12/2018 | Alon et al. |
| 10,464,154 B2 | 11/2019 | Alon et al. |
| 10,635,958 B2 | 4/2020 | Alon et al. |
| 10,744,585 B2 | 8/2020 | Alon et al. |
| 2002/0159081 A1 | 10/2002 | Zeng |
| 2003/0026608 A1 | 2/2003 | Malloy Desormeaux |
| 2004/0020989 A1 | 2/2004 | Muramatsu |
| 2006/0013502 A1 | 1/2006 | Weigand |
| 2007/0051813 A1 | 3/2007 | Kiuchi et al. |
| 2007/0152060 A1 | 7/2007 | Killiccote |
| 2008/0137912 A1 | 6/2008 | Kim et al. |
| 2008/0143482 A1 | 6/2008 | Shoarinejad et al. |
| 2009/0148037 A1 | 6/2009 | Moriyama et al. |
| 2011/0128288 A1 | 6/2011 | Petrou et al. |
| 2011/0178708 A1 | 7/2011 | Zhang et al. |
| 2011/0303746 A1 | 12/2011 | Learmonth et al. |
| 2012/0039529 A1 | 2/2012 | Rujan |
| 2012/0063682 A1 | 3/2012 | Alacoque |
| 2012/0249807 A1 | 10/2012 | Sugden |
| 2012/0274775 A1 | 11/2012 | Reiffel |
| 2014/0144996 A1 | 5/2014 | Friedman et al. |
| 2015/0363916 A1 | 12/2015 | Botzas |
| 2016/0188938 A1 | 6/2016 | Summerfield |
| 2016/0283763 A1 | 9/2016 | Hosokane |
| 2019/0073814 A1 | 3/2019 | Alon et al. |

FOREIGN PATENT DOCUMENTS

| | | |
|---|---|---|
| JP | 2008134989 A | 6/2008 |
| WO | 01/86582 A1 | 11/2001 |
| WO | 2010115464 A1 | 10/2010 |
| WO | 2012022678 A1 | 2/2012 |
| WO | 2012120524 A2 | 9/2012 |

OTHER PUBLICATIONS

Guru et al., "Non-parametric adaptive region of support useful for corner detection: a novel approach", Pattern Recognition, vol. 37, issue 1, pp. 165-168, Jan. 2004.

Harris et al., "A Combined Corner and Edge Detector", Proceedings of the 4th Alvey Vision Conference, pp. 147-151, Aug. 31-Sep. 2, 1988.

Specification of sRGB, specified in IEC 61966-2-1, pp. 1-2, year 1999.

Carey, B., "E3 2012: Year of the second screen with Xbox Smart Glass and Wii U", pp. 1-3, Jun. 4, 2012 (http://news.cnet.com/8301-33692_3-57446945-305/e3-2012-year-of-the-second-screen-with-xbox-smart-glassand-wii-u/).

Paliath, P., "Xbox SmartGlass Announced, The 'Second Screen' for Your Xbox 360, Allows AirPlay-like Streams to iOS,Android, Windows Phone", 1 page, Jun. 5, 2012.

Biggs, J., "Microsoft Introduces Second-Screen Feature", 1 page, Jun. 4, 2012 (http://techcrunch.com/2012/06/04/microsoft-introduces-second-screen-feature-xbox-smartglass/).

Warren, C., "Xbox SmartGlass Brings the Second Screen to Games and Videos", 1 page, Jun. 4, 2012.

Moravec, H.P., "Obstacle Avoidance and Navigation in the Real World by a Seeing Robot Rover", Technical Report CMU-RI-TR3, Robotics Institute, Carnegie-Mellon University, USA, pp. 1-175, Sep. 2, 1980 (submitted as 2 attachments).

Shi et al., "Good Features to Track", 9th IEEE Conference on Computer Vision and Pattern Recognition, pp. 593-600, Jun. 21-23, 1994.

Tomasi et al., "Detection and Tracking of Point Features", Technical Report CMU-CS-91-132, pp. 1-22, Apr. 1991.

| NA | $R_{1,2}G_{2,2}B_{2,1}$ | NA | NA | NA | NA | NA | NA |
|---|---|---|---|---|---|---|---|
| NA | $R_{1,2}G_{2,2}B_{2,1}$ | $R_{1,2}G_{2,2}B_{2,3}$ | $R_{1,4}G_{2,4}B_{2,3}$ | NA | $R_{1,4}G_{2,4}B_{2,5}$ | $R_{1,6}G_{2,6}B_{2,5}$ | $R_{1,6}G_{2,6}B_{2,7}$ |
| NA | $R_{3,2}G_{3,1}B_{2,1}$ | $R_{3,2}G_{3,3}B_{2,3}$ | $R_{3,4}G_{3,3}B_{2,3}$ | NA | $R_{3,4}G_{3,5}B_{2,5}$ | $R_{3,6}G_{3,5}B_{2,5}$ | $R_{3,6}G_{3,7}B_{2,7}$ |
| NA | $R_{3,2}G_{4,2}B_{4,1}$ | $R_{3,2}G_{4,2}B_{4,3}$ | $R_{3,4}G_{4,4}B_{4,3}$ | NA | $R_{3,4}G_{4,4}B_{4,5}$ | $R_{3,6}G_{4,6}B_{4,5}$ | $R_{3,6}G_{4,6}B_{4,7}$ |
| NA | $R_{5,2}G_{5,1}B_{4,1}$ | $R_{5,2}G_{5,3}B_{4,3}$ | $R_{5,4}G_{5,3}B_{4,3}$ | NA | $R_{5,4}G_{5,5}B_{4,5}$ | $R_{5,6}G_{5,5}B_{4,5}$ | $R_{5,6}G_{5,7}B_{4,7}$ |
| NA | $R_{5,2}G_{6,2}B_{6,1}$ | $R_{5,2}G_{6,2}B_{6,3}$ | $R_{5,4}G_{6,4}B_{6,3}$ | NA | $R_{5,4}G_{6,4}B_{6,5}$ | $R_{5,6}G_{6,6}B_{6,5}$ | $R_{5,6}G_{6,6}B_{6,7}$ |
| NA | $R_{7,2}G_{7,1}B_{6,1}$ | $R_{7,2}G_{7,3}B_{6,3}$ | $R_{7,4}G_{7,3}B_{6,3}$ | NA | $R_{7,4}G_{7,5}B_{6,5}$ | $R_{7,6}G_{7,5}B_{6,5}$ | $R_{7,6}G_{7,7}B_{6,7}$ |

| | | | | | | |
|---|---|---|---|---|---|---|
| NA | NA | NA | NA | NA | NA | NA |
| NA | $R_{1,6}G_{2,6}B_{2,7}$ | $R_{1,6}G_{2,6}B_{2,5}$ | $R_{1,4}G_{2,4}B_{2,5}$ | $R_{1,4}G_{2,4}B_{2,3}$ | $R_{1,2}G_{2,2}B_{2,3}$ | $R_{1,2}G_{2,2}B_{2,1}$ |
| NA | $R_{3,6}G_{3,7}B_{2,7}$ | $R_{3,6}G_{3,5}B_{2,5}$ | $R_{3,4}G_{3,5}B_{2,5}$ | $R_{3,4}G_{3,3}B_{2,3}$ | $R_{3,2}G_{3,3}B_{2,3}$ | $R_{3,2}G_{3,1}B_{2,1}$ |
| NA | $R_{3,6}G_{4,6}B_{4,7}$ | $R_{3,6}G_{4,6}B_{4,5}$ | $R_{3,4}G_{4,4}B_{4,5}$ | $R_{3,4}G_{4,4}B_{4,3}$ | $R_{3,2}G_{4,2}B_{4,3}$ | $R_{3,2}G_{4,2}B_{4,1}$ |
| NA | $R_{5,6}G_{5,7}B_{4,7}$ | $R_{5,6}G_{5,5}B_{4,5}$ | $R_{5,4}G_{5,5}B_{4,5}$ | $R_{5,4}G_{5,3}B_{4,3}$ | $R_{5,2}G_{5,3}B_{4,3}$ | $R_{5,2}G_{5,1}B_{4,1}$ |
| NA | $R_{5,6}G_{6,6}B_{6,7}$ | $R_{5,6}G_{6,6}B_{6,5}$ | $R_{5,4}G_{6,4}B_{6,5}$ | $R_{5,4}G_{6,4}B_{6,3}$ | $R_{5,2}G_{6,2}B_{6,3}$ | $R_{5,2}G_{6,2}B_{6,1}$ |
| NA | $R_{7,6}G_{7,7}B_{6,7}$ | $R_{7,6}G_{7,5}B_{6,5}$ | $R_{7,4}G_{7,5}B_{6,5}$ | $R_{7,4}G_{7,3}B_{6,3}$ | $R_{7,2}G_{7,3}B_{6,3}$ | $R_{7,2}G_{7,1}B_{6,1}$ |

| | | | | | | |
|---|---|---|---|---|---|---|
| $R_{1,2}G_{1,1}B_{2,1}$ | $R_{3,2}G_{2,2}B_{2,1}$ | $R_{3,2}G_{3,1}B_{4,1}$ | $R_{5,2}G_{4,2}B_{4,1}$ | $R_{5,2}G_{5,1}B_{6,1}$ | $R_{7,2}G_{6,2}B_{6,1}$ | NA |
| $R_{1,2}G_{1,3}B_{2,3}$ | $R_{3,2}G_{2,2}B_{2,3}$ | $R_{3,2}G_{3,3}B_{4,3}$ | $R_{5,2}G_{4,2}B_{4,3}$ | $R_{5,2}G_{5,3}B_{6,3}$ | $R_{7,2}G_{6,2}B_{6,3}$ | NA |
| $R_{1,4}G_{1,3}B_{2,3}$ | $R_{3,4}G_{2,4}B_{2,3}$ | $R_{3,4}G_{3,3}B_{4,3}$ | $R_{5,4}G_{4,4}B_{4,3}$ | $R_{5,4}G_{5,3}B_{6,3}$ | $R_{7,4}G_{6,4}B_{6,3}$ | NA |
| $R_{1,4}G_{1,5}B_{2,5}$ | $R_{3,4}G_{2,4}B_{2,5}$ | $R_{3,4}G_{3,5}B_{4,5}$ | $R_{5,4}G_{4,4}B_{4,5}$ | $R_{5,4}G_{5,5}B_{6,5}$ | $R_{7,4}G_{6,4}B_{6,5}$ | NA |
| $R_{1,6}G_{1,5}B_{2,5}$ | $R_{3,6}G_{2,6}B_{2,5}$ | $R_{3,6}G_{3,5}B_{4,5}$ | $R_{5,6}G_{4,6}B_{4,5}$ | $R_{5,6}G_{5,5}B_{6,5}$ | $R_{7,6}G_{6,6}B_{6,5}$ | NA |
| $R_{1,6}G_{1,7}B_{2,7}$ | $R_{3,6}G_{2,6}B_{2,7}$ | $R_{3,6}G_{3,7}B_{4,7}$ | $R_{5,6}G_{4,6}B_{4,7}$ | $R_{5,6}G_{5,7}B_{6,7}$ | $R_{7,6}G_{6,6}B_{6,7}$ | NA |
| NA | NA | NA | NA | NA | NA | NA |

FIG. 6D

| | | | | | | |
|---|---|---|---|---|---|---|
| $R_{1,6}G_{1,7}B_{2,7}$ | $R_{3,6}G_{2,6}B_{2,7}$ | $R_{3,6}G_{3,7}B_{4,7}$ | $R_{5,6}G_{4,6}B_{4,7}$ | $R_{5,6}G_{5,7}B_{6,7}$ | $R_{7,6}G_{6,6}B_{6,7}$ | NA |
| $R_{1,6}G_{1,5}B_{2,5}$ | $R_{3,6}G_{2,6}B_{2,5}$ | $R_{3,6}G_{3,5}B_{4,5}$ | $R_{5,6}G_{4,6}B_{4,5}$ | $R_{5,6}G_{5,5}B_{6,5}$ | $R_{7,6}G_{6,6}B_{6,5}$ | NA |
| $R_{1,4}G_{1,5}B_{2,5}$ | $R_{3,4}G_{2,4}B_{2,5}$ | $R_{3,4}G_{3,5}B_{4,5}$ | $R_{5,4}G_{4,4}B_{4,5}$ | $R_{5,4}G_{5,5}B_{6,5}$ | $R_{7,4}G_{6,4}B_{6,5}$ | NA |
| $R_{1,4}G_{1,3}B_{2,3}$ | $R_{3,4}G_{2,4}B_{2,3}$ | $R_{3,4}G_{3,3}B_{4,3}$ | $R_{5,4}G_{4,4}B_{4,3}$ | $R_{5,4}G_{5,3}B_{6,3}$ | $R_{7,4}G_{6,4}B_{6,3}$ | NA |
| $R_{1,2}G_{1,3}B_{2,3}$ | $R_{3,2}G_{2,2}B_{2,3}$ | $R_{3,2}G_{3,3}B_{4,3}$ | $R_{5,2}G_{4,2}B_{4,3}$ | $R_{5,2}G_{5,3}B_{6,3}$ | $R_{7,2}G_{6,2}B_{6,3}$ | NA |
| $R_{1,2}G_{1,1}B_{2,1}$ | $R_{3,2}G_{2,2}B_{2,1}$ | $R_{3,2}G_{3,1}B_{4,1}$ | $R_{5,2}G_{4,2}B_{4,1}$ | $R_{5,2}G_{5,1}B_{6,1}$ | $R_{7,2}G_{6,2}B_{6,1}$ | NA |
| NA | NA | NA | NA | NA | NA | NA |

FIG. 6E

DETECTION OF MACHINE-READABLE TAGS WITH HIGH RESOLUTION USING MOSAIC IMAGE SENSORS

CROSS-REFERENCE TO RELATED APPLICATION

This application claims the benefit of U.S. Provisional Patent Application 62/696,363, filed Jul. 11, 2018, which is incorporated herein by reference.

FIELD OF THE INVENTION

The present invention relates generally to methods, systems and software for image processing and display, and specifically to detection and decoding of machine-readable symbols in images captured by an image sensor.

BACKGROUND

A wide variety of methods and standards are known in the art for encoding information in machine-readable tags, i.e., graphical elements that can be read by a computer using an image sensor or other type of optical sensor. The pattern of graphical elements in the machine-readable tag encodes a particular digital value, in accordance with an applicable encoding standard. The best-known standards of this sort are monochromatic barcodes, including the traditional one-dimensional arrays of stripes and two-dimensional barcodes, such as QR codes.

Other types of image-based computer-readable encoding schemes and symbols use color information, rather than the monochrome symbols provided by conventional barcodes. For example, PCT International Publication WO 2013/182963, whose disclosure is incorporated herein by reference, describes a method for encoding information that includes specifying a digital value and providing a symbol comprising a plurality of polygons meeting at a common vertex and having different, respective colors selected so as to encode the specified digital value. As another example, PCT International Publication WO 2012/022678 describes a visual reference tag formed from an array of cells, wherein each cell is visually distinct from all other cells in a given neighborhood and each of said cells contains a single visual cue, for example a unique color, selected from a finite number of visual cues.

Machine-readable tags, such as QR codes, are commonly used to provide information to camera-enabled mobile devices, such as smartphones and tablet computers. The user of such a device aims the camera to capture an image of the tag of interest, and a microprocessor in the device processes the image in order to detect and decode the information in the tag. The cameras that are used in this context typically contain a solid-state image sensor with a multi-colored mosaic filter overlay. (Image sensors of this type are referred to herein as "mosaic image sensors," and the array of raw image data that such sensors output is referred to as a "mosaic image.") A mosaic filter is a mask of interleaved miniature color filter elements, in which a different, respective filter element is positioned in front of each detector element of the image sensor.

One common type of color mosaic filter is called a "Bayer sensor" or "Bayer mosaic," which has the following general form (in which the letters represent colors, with R denoting red, G denoting green, and B denoting blue):

| G | R | G | R | ... |
|---|---|---|---|---|
| B | G | B | G | |
| G | R | G | R | ... |
| B | G | B | G | |
| ⋮ | ⋮ | | ⋱ | |

The Bayer mosaic is described, for example, in U.S. Pat. No. 3,971,065. Other mosaic filters that are known in the art use different color schemes, such as the complementary colors cyan, magenta and yellow. In any case, the mosaic image that is output by such a sensor is made up of a number of interleaved sub-matrices, wherein each sub-matrix contains the pixels of one of the colors in the mosaic.

In most devices, the raw mosaic output of the image sensor is passed to an image signal processor (ISP), which converts the output into a standard color image, which can then be presented on a display screen. The ISP computes luminance (Y) and chrominance (C) values for each pixel of the output image based on a corresponding group of pixels of different colors in the mosaic image output by the image sensor. The ISP may further process the luminance and chrominance to give R, G and B color values for each pixel in the output image. An array of this sort of RGB pixel values is referred to herein as an "RGB image."

SUMMARY

Embodiments of the present invention that are described hereinbelow provide improved methods for detecting and decoding computer-readable symbols in an image captured by an image sensor, as well as apparatus and software that implement such methods.

There is therefore provided, in accordance with an embodiment of the invention, imaging apparatus, including a mosaic image sensor, which is configured to capture and output a mosaic image including a matrix of pixels that is made up of multiple interleaved sub-matrices, each sub-matrix containing the pixels of a single respective color. Processing circuitry is configured to process the pixels in each of one or more of the sub-matrices separately from the pixels in the other sub-matrices in order to identify in the mosaic image a graphical tag that encodes a digital value in a machine-readable form.

In a disclosed embodiment, the sub-matrices include red, green and blue sub-matrices.

In some embodiments, the processing circuitry is configured to identify, in the one or more of the sub-matrices, one or more candidate areas of the mosaic image that satisfy a predefined criterion for containing the graphical tag, and to apply a tag decoding process to the candidate areas in the mosaic image. In some of these embodiments, the processing circuitry is configured to compute a variance of the pixels in each of the one or more of the sub-matrices, and to identify one or more windows within the mosaic image in which the computed variance satisfies a predefined criterion as the candidate areas. In one such embodiment, the graphical tag includes a monochromatic pattern, and the processing circuitry is configured, based on the pixels in each of the sub-matrices within each of the one or more windows, to select a respective binarization threshold for the pixels in each sub-matrix within each window, and to binarize the pixels using the respective binarization threshold and process the binarized pixels from the multiple sub-matrices in order to decode the graphical tag.

In other embodiments, the graphical tag includes a plurality of color elements of different respective colors, which meet at one or more color vertex points, and the processing circuitry is configured to identify the one or more candidate areas by finding respective locations of the color vertex points in the mosaic image. In a disclosed embodiment, the processing circuitry is configured to find the respective locations of the color vertex points by making a comparison of maximal and minimal values of the pixels in each of the one or more of the sub-matrices at a predefined set of probe positions surrounding each of a set of candidate locations in the mosaic image, and to identify the color vertex points among the candidate locations responsively to the comparison.

In further embodiments, the processing circuitry is configured to produce at least one enhanced mosaic image by replicating the pixels in each of the sub-matrices to neighboring locations within the matrix of pixels, and to identify and decode the graphical tag by processing the at least one enhanced mosaic image. In one embodiment, the at least one enhanced mosaic images includes a plurality of different enhanced mosaic images, which are produced by replicating the pixels in each of the sub-matrices to different neighboring locations in each of the different enhanced mosaic images, and the processing circuitry is configured to identify and decode the graphical tag by processing all of the different enhanced mosaic images.

In a disclosed embodiment, the apparatus includes a display, wherein the processing circuitry includes an image signal processor, which is configured to generate an output image for presentation on the display by combining the pixels in the multiple interleaved sub-matrices in order to compute luminance and chrominance values over the output image.

There is also provided, in accordance with an embodiment of the invention, a method for image processing, which includes receiving from a mosaic image sensor a mosaic image including a matrix of pixels that is made up of multiple interleaved sub-matrices, each sub-matrix containing the pixels of a single respective color. The pixels in each of one or more of the sub-matrices are processed separately from the pixels in the other sub-matrices in order to identify in the mosaic image a graphical tag that encodes a digital value in a machine-readable form.

There is additionally provided, in accordance with an embodiment of the invention, a computer software product, including a non-transitory computer-readable medium in which program instructions are stored, which instructions, when read by a processor, cause the processor to receive from a mosaic image sensor a mosaic image including a matrix of pixels that is made up of multiple interleaved sub-matrices, each sub-matrix containing the pixels of a single respective color, and to process the pixels in each of one or more of the sub-matrices separately from the pixels in the other sub-matrices in order to identify in the mosaic image a graphical tag that encodes a digital value in a machine-readable form.

The present invention will be more fully understood from the following detailed description of the embodiments thereof, taken together with the drawings in which:

BRIEF DESCRIPTION OF THE DRAWINGS

FIGS. 6B-6E are schematic representations of RGB images that are produced based on the mosaic image of FIG. 6A and are used in detecting and decoding machine-readable tags, in accordance with an embodiment of the invention.

DETAILED DESCRIPTION OF EMBODIMENTS

Overview

Figure 1:
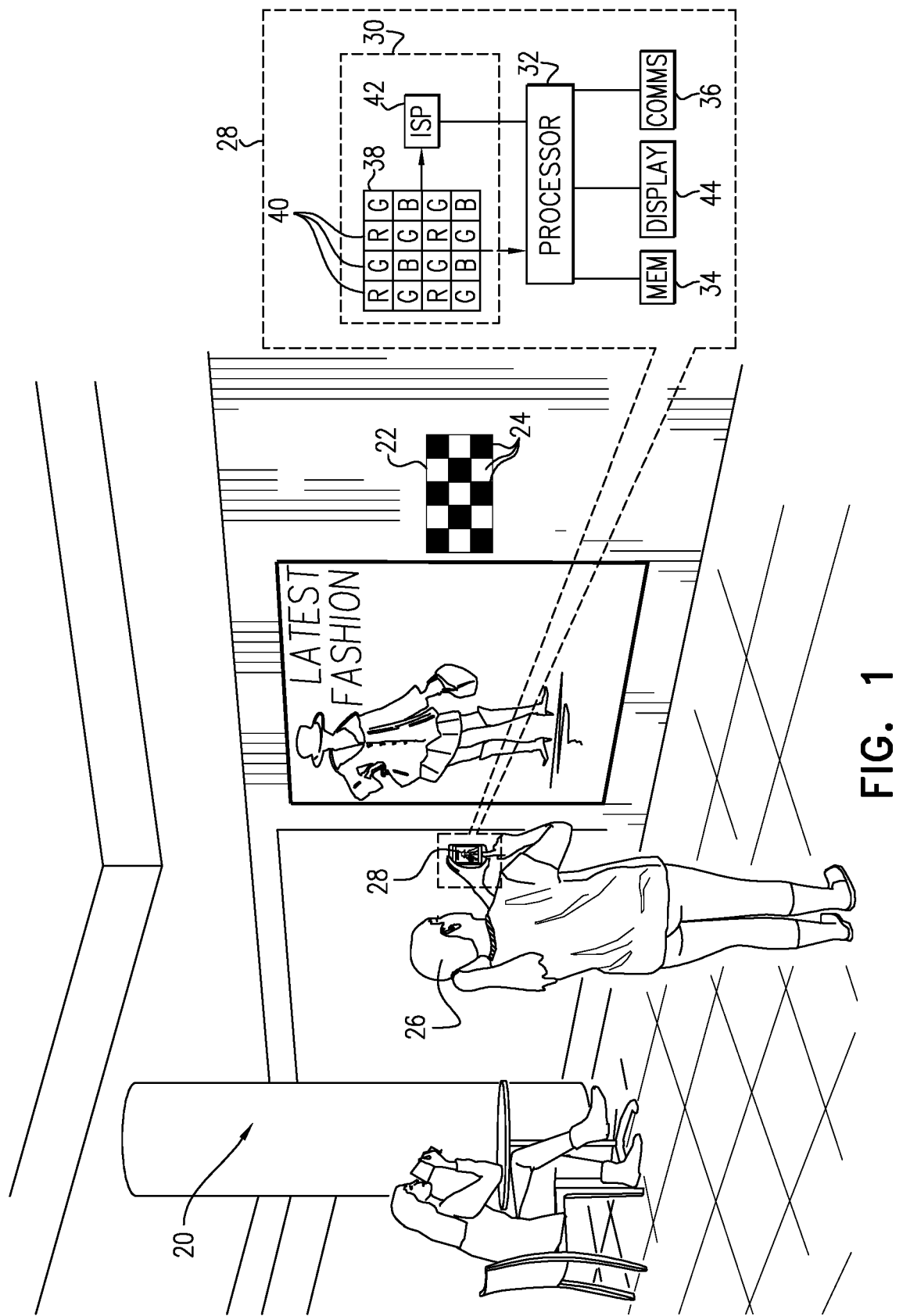
FIG. 1 is a schematic, pictorial illustration of a system for information display, in accordance with an embodiment of the present invention.

The ISPs that are used in most electronic cameras, including those incorporated in mobile devices, are generally designed and optimized to produce output images for display that are visually pleasing. Fine details of the image are liable to be lost in this process. To begin with, the ISP performs a de-mosaicking operation in which it combines the pixels in the different color sub-matrices of the mosaic image produced by the image sensor in order to compute the luminance and chrominance values over the output image. Combining the pixels in this way inherently reduces the image resolution. Other standard operations, such as noise reduction and color and intensity transformations, can enhance the appearance of the image, but may smooth out the sharp variations in intensity and color that are characteristic of most machine-readable tags. In consequence, it may become necessary to hold the camera close to a given tag, so that the tag occupies a large area of the image captured by the camera, in order for the processor in the mobile device to successfully identify and decode the tag.

Embodiments of the present invention that are described herein enhance the ability of an image processing device to identify and decode machine-readable tags by processing the raw images generated by a mosaic image sensor in the mosaic domain, i.e., before the images are de-mosaicked and enhanced for display. In consequence the device is able to detect and decode tags with enhanced resolution and precision relative to devices that are known in the art. These features of the present invention make the detection and decoding operations more robust and allow the user to capture images of such tags from a greater distance and with less sensitivity to lighting and other imaging conditions. Embodiments of the present invention are applicable to both monochrome and color tags.

The disclosed embodiments provide imaging apparatus comprising a mosaic image sensor, which captures and outputs mosaic images. (A mosaic image, as defined above, comprises a matrix of pixels that is made up of multiple interleaved sub-matrices, each containing pixels of a single respective color.) When the captured mosaic images contain a graphical tag, which encodes a digital value in a machine-readable form, processing circuitry in the apparatus identifies the tag by processing the pixels in the different color sub-matrices separately from the pixels in the other sub-matrices, and then decodes the digital value.

Typically, the sub-matrices comprise red, green and blue sub-matrices, but the principles of the present invention may similarly be applied to other sorts of color mosaics. Although the embodiments described below use all the color sub-matrices in identifying and decoding machine-readable tasks, alternative embodiments may use only one or two of these sub-matrices. Furthermore, although the embodiments described below provide for integration of image capture and processing in a single device, the methods of mosaic image processing that are applied in the disclosed devices may alternatively be implemented in an apparatus or computer software product that is separate and independent from the image sensor.

A number of different computational approaches are described below. In some embodiments, the processing circuitry identifies, in one or more of the sub-matrices of the mosaic image, one or more candidate areas of the mosaic image that satisfy a certain predefined criterion for containing the graphical tag. The processing circuitry may then apply a tag decoding process specifically to these candidate areas in the mosaic image, thus reducing the computational load and time required for decoding.

In another embodiment, the processing circuitry produces one or more enhanced mosaic images by replicating the pixels in each of the sub-matrices to neighboring locations within the matrix of pixels. The processing circuitry is then able to identify and decode the graphical tag with enhanced resolution by processing the enhanced mosaic images.

System Description

FIG. 1 is a schematic, pictorial illustration of a system 20 for information display, in accordance with an embodiment of the present invention. System 20 comprises a machine-readable graphical tag 22, which is positioned in a certain target location. Tag 22 comprises an arrangement of graphical elements 24, forming a monochromatic or color pattern, which encodes a digital value in a machine-readable form in accordance with a certain encoding standard or convention.

A user 26 operates a mobile computing device 28 (such as a smartphone in the present example) to capture an image that includes tag 22. As shown in the inset, device 28 comprises a camera module 30, which includes a mosaic image sensor 38 comprising a matrix of sensing elements overlaid by a mosaic of different, respective color filters 40. An objective lens (not shown in the figures) forms an image on image sensor 38 of the scene viewed by user 26, including tag 22. Image sensor 38 thus captures and outputs a mosaic image that is made up of multiple interleaved sub-matrices. Each sub-matrix contains the pixels of a single respective color—red, green or blue. The sub-matrices are interleaved in the sense that the nearest neighbors of each pixel (meaning the pixels above, below and to the sides) are of different colors and thus belong to different sub-matrices from the pixel itself.

Camera module 30 typically comprises an ISP 42, which receives the mosaic image from image sensor 38 and performs demosaicking and image enhancement operations that are known in the art in order generate an output image for presentation on a display 44. In carrying out these functions, ISP 42 combines the pixels in the different color sub-matrices in order to compute luminance and chrominance values over the output image, and may then convert the luminance and chrominance back into R, G and B values at each pixel of the output image. Typically, this output image is presented on a display 44.

In addition to these conventional image capture and processing functions, a processor 32 in device 28 receives the mosaic image from image sensor 38, and processes the pixels in each of the different color sub-matrices (R, G and B in this example) in order to identify tag 22 in the mosaic image. For this purpose, processor 32 processes the pixels in each of the sub-matrices separately from the pixels in the other sub-matrices. After identifying the tag, processor 32 analyzes the arrangement of graphical elements (shapes and/or colors) in tag 22 in order to decode the digital value that the tag encodes. Processor 32 may store the mosaic image and/or results of the decoding process in a memory 34, and may use the decoded value in communicating with a designated server, via a communication interface 36; but these functions are beyond the scope of the present description.

Processor 32 typically comprises a microprocessor, which carries out the functions that are described herein under the control of suitable software, such as an application program ("app"). This software may be downloaded to device 28 in electronic form, over a network, for example. Additionally or alternatively, the software may be provided and/or stored on tangible, non-transitory memory media, such as optical, electronic or magnetic memory. Further additionally or alternatively, at least some of the functions of processor 32 may be implemented in dedicated or programmable hardware logic. All such implementations are considered to be within the scope of the present invention. The processing components in device 28, including processor 32 and ISP 42, are collectively referred to in the present description and in the claims as "processing circuitry."

Processor 32 processes the image captured by camera 34 and automatically recognizes the internal arrangement of color elements in symbol 22 as a structure that contains encoded information. Processor 32 reads the colors and vertex locations in the image of symbol 22 and decodes the information that they encode. In addition, processor 32 decodes further information that is encoded in the shape characteristics of the non-rectangular border of symbol 22.

As noted earlier, tag 22 may comprise either a monochromatic or a color pattern. Examples of monochromatic patterns include barcodes, and particularly QR codes, which encode data in accordance with a well-defined standard. A color tag, for example, may encode data in a manner similar to that described in the above-mentioned PCT publication WO 2013/182963. In this latter case, briefly stated, the tag comprises multiple color elements of different respective colors, which meet at one or more color vertex points (CVPs). Each color is assigned a three-bit code, which comprises respective binary values representing three primary color components (red, green and blue) of the colors of the color elements (such as elements 24) making up the tag. The individual digital codes of the color elements surrounding each CVP in symbol 22 are combined, typically by concatenation, to give a corresponding digital value. When the symbol comprises multiple CVPs, as in the pictured example, the specified digital value is obtained by combining (again, typically by concatenation) the digital values encoded by the individual vertices.

These particular types of tags, however, are described here solely by way of example and for concreteness of description. The methods described hereinbelow may alternatively be applied, mutatis mutandis, to both monochromatic and color machine-readable tags of other types.

Identifying and extracting the graphical tag in a large image can be a difficult and time-consuming task for processor 32. To facilitate this operation, processor 32 identifies candidate areas of the mosaic image that satisfy a predefined criterion for containing the type of tag that is of interest. For this purpose, the processor separately processes the R, G and B sub-matrices of the mosaic image that it receives from image sensor 38. The processor then applies a tag decoding process to the candidate areas in the mosaic image. The methods applied by the processor in identifying the candidate areas vary depending upon the type of tag in question, and particularly whether it is a monochrome or color tag. Example methods for this purpose are presented below.

Identifying Monochromatic Tags

In methods that are known in the art for identifying and decoding monochromatic tags, the color image that is output by the ISP is first binarized. For this purpose, the processor sets a certain luminance threshold (which may vary over the area of the image), and then assigns a binary value of 0 or 1 to each pixel in the color image, depending upon whether the luminance of the pixel is above or below the threshold. The processor uses these binary values in identifying and decoding the tag.

In the present embodiment, on the other hand, processor 32 separately binarizes each of the color sub-matrices in the mosaic image that is output by image sensor 38. For this purpose, the processor computes and applies different, respective binarization thresholds for the different sub-matrices, thus avoiding image degradation that can affect post-ISP binarization. The resulting high-resolution binary image enables processor 32 to detect finer binary details, and thus identify and decode tags that occupy a smaller area of the image, than would be possible using post-ISP binarization.

A good choice of a binarization threshold $\tau$ for an area of an image is one that separates the histogram H of pixel values t in the area into two classes with minimal intra-class variance. The two classes can be defined as $H_0$ and $H_1$, such that $H_0=\{H(t)|t\leq\tau\}$; $H_1=\{H(t)|t>\tau\}$. Each class is assigned a weight $W_0$ or $W_1$:

$$W_0 = \frac{\sum_0^{t\leq\tau} H(t)}{\sum H(t)}; W_1 = \frac{\sum_0^{t>\tau} H(t)}{\sum H(t)}$$

The intra-class variance is then given by:

$$\sigma_W^2(\tau)=W_0 * \sigma_0^2 + W_1 * \sigma_1^2$$

wherein $\sigma_0^2$, $\sigma_1^2$ are the variances of classes $H_0$, $H_1$, respectively. The overall variance $\sigma^2$ for a particular area of an image that is binarized using a certain threshold $\tau$ is given by:

$$\sigma^2 = \sigma_W^2 + W_0 * W_1 * (\mu_0 - \mu_1)^2$$

wherein $\mu_0$, $\mu_1$ are the variances of classes $H_0$, $H_1$ respectively. The threshold $\tau$ can be optimized by minimizing $\sigma^2$.

The relative minimal intra-class variance $\gamma$ is defined herein as the ratio between the minimal intra-class and overall variances:

$$\gamma = \frac{\min_\tau(\sigma_W^2(\tau))}{\sigma^2}$$

The value of $\gamma$ is a good indicator of whether a given area of an image represents data that is binary by nature, as will occur in areas occupied by monochromatic machine-readable tags: Such areas will typically have low values of $\gamma$, for example less than 0.1, meaning that the intra-class variances are low, while the overall variance is high. Areas of the image containing continuous gray-scale or color content will have much higher intra-class variance, and thus larger values of $\gamma$.

Figure 2:
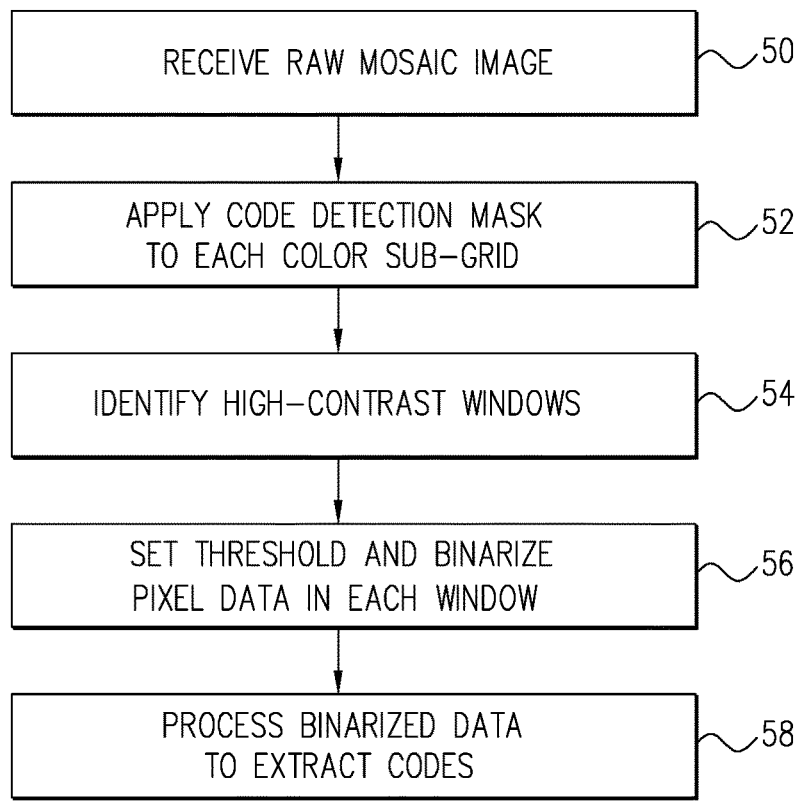
FIG. 2 is a flow chart, which schematically illustrates a method for detecting and decoding machine-readable tags using a mosaic image sensor, in accordance with an embodiment of the invention.

FIG. 2 is a flow chart, which schematically illustrates a method for detecting and decoding machine-readable tags in a mosaic image based on the principles explained above, in accordance with an embodiment of the invention. The method is described here particularly with respect to tags comprising a monochromatic pattern, such as barcodes and QR codes, but it may alternatively be applied, mutatis mutandis, to certain types of color tags. In accordance with this method, processor 32 computes the variance of the pixels in one or more of the color sub-matrices of the mosaic image, and uses the variance in identifying one or more windows within the mosaic image in which the computed variance satisfies a predefined criterion as candidate areas to contain a machine-readable tag. This window-based approach is useful in reducing the computational load on processor 32 and improving detection of tags since the image typically contains only certain areas that hold binary information, and the illumination of the image may be non-uniform.

Processor 32 receives a raw mosaic output image from image sensor 38, at an input step 50. (The image is "raw" in the sense that it has not undergone demosaicking by ISP 42.) In order to find the areas that are candidates to contain a machine-readable tag, processor 32 applies a mask based on the relative minimal intra-class variance $\gamma$, as defined above, at a mask application step 52. For each pixel in the sub-matrix of the mosaic image under evaluation, processor 32 applies a sliding window of size N×N that is centered on the pixel and cropped from the sub-matrix, and then computes the value of $\gamma$ over the window for a given binarization threshold. If the result is lower than a certain threshold variance $\gamma_{th}$, then the pixel is identified as a candidate pixel.

Assuming image sensor 38 to have a Bayer-type mosaic filter, as described above, the sliding window for the red and blue pixels can be defined by an N×N matrix of the form:

$$\begin{pmatrix} 1 & 0 & 1 & 0 & \cdots \\ 0 & 0 & 0 & 0 & \\ 1 & 0 & 1 & 0 & \cdots \\ 0 & 0 & 0 & 0 & \\ \vdots & & \vdots & & \ddots \end{pmatrix}$$

The sliding window for the green pixels is defined by:

$$\begin{pmatrix} 1 & 0 & 1 & 0 & \cdots \\ 0 & 1 & 0 & 1 & \\ 1 & 0 & 1 & 0 & \cdots \\ 0 & 1 & 0 & 1 & \\ \vdots & & \vdots & & \ddots \end{pmatrix}$$

Processor 32 combines groups of candidate pixels found at step 52 into candidate areas, or windows, at a window definition step 54. To achieve full resolution, processor 32 may apply this process over each of the color sub-matrices of the mosaic image, and then merge the results. The processor may apply techniques of morphological closing, as are known in the art, in order to obtain one or more compact, well-separated candidate windows of this sort. These candidate windows will be characterized, as explained above, by two classes of pixels with low intra-class variance and high variance, i.e., high contrast, between the classes.

Once the candidate windows have been defined at step 54, processor 32 selects a respective binarization threshold for the pixels in each sub-matrix within each window, and binarizes the pixels in each sub-matrix using the respective binarization threshold, at a binarization step 56. Alternatively, the processor may use the respective binarization thresholds that were applied at step 52. The three sub-matrices of binary values that are obtained from the three different colors in image sensor 38 can be combined at this step to give full sensor grid binarization. Processor 32 then processes the binarized pixel values from the combined sub-matrices in order to decode the graphical tag, at a code extraction step 58.

Identifying Color Vertex Points

As explained earlier, when color is used in encoding information in a machine-readable tag, such as those described in the above-mentioned PCT International Publication WO 2013/182963, the graphical tag often comprises multiple color elements of different respective colors, which meet at one or more color vertex points (CVPs). In this case, processor 32 identifies candidate areas of the image captured by camera module 30 by finding respective candidate locations of the CVPs in the mosaic image that is output by image sensor 38. For this purpose, the processor probes the intensities of the pixels of each different color in the mosaic at certain probe locations surrounding each potential CVP location. When the intensities of the color pixels at the different probe locations satisfy a certain difference criterion, processor 32 can conclude that the potential CVP location is surrounded by elements of different colors, and thus identifies this CVP location as a candidate tag location. The criteria used in identifying the CVPs in the tags described in WO 2013/182963 are explained, for example, on pages 12-15 of this publication. Alternatively, other criteria may be applied to other types of tags.

Figure 3:
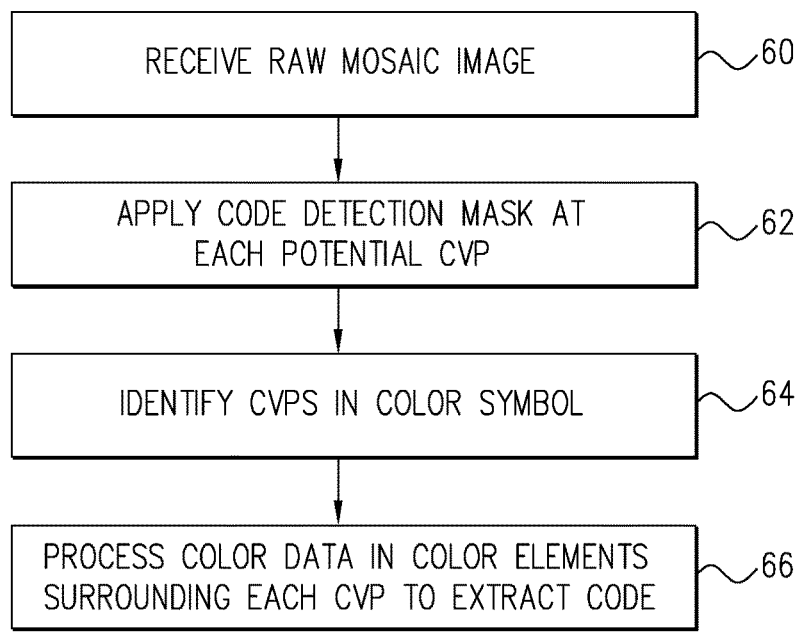
FIG. 3 is a flow chart, which schematically illustrates a method for detecting and decoding machine-readable tags using a mosaic image sensor, in accordance with another embodiment of the invention.

FIG. 3 is a flow chart, which schematically illustrates a method for detecting and decoding color tags of this sort using mosaic image sensor 38, in accordance with another embodiment of the invention. As in the preceding embodiment, to initiate this method, processor 32 receives a raw mosaic output image from image sensor 38, at an input step 60.

In order to find the areas that are candidates to contain a machine-readable tag, processor 32 applies a mask that checks the values of pixels of different colors at certain locations surround each potential CVP, at a mask application step 62. In the present example, it is assumed that the color elements making up the tags of interest are rectangular, meaning that each CVP will be surrounded by four elements of different colors. In this case, processor 32 reads and tests the pixels of each color in the mosaic image at four probe locations diagonally surrounding the CVP: $d_1=(-D, -D)$, $d_2=(D, -D)$, $d_3=(D, D)$ and $d_4=(-D, D)$, with D being a positive integer, typically two or greater.

Figure 4:
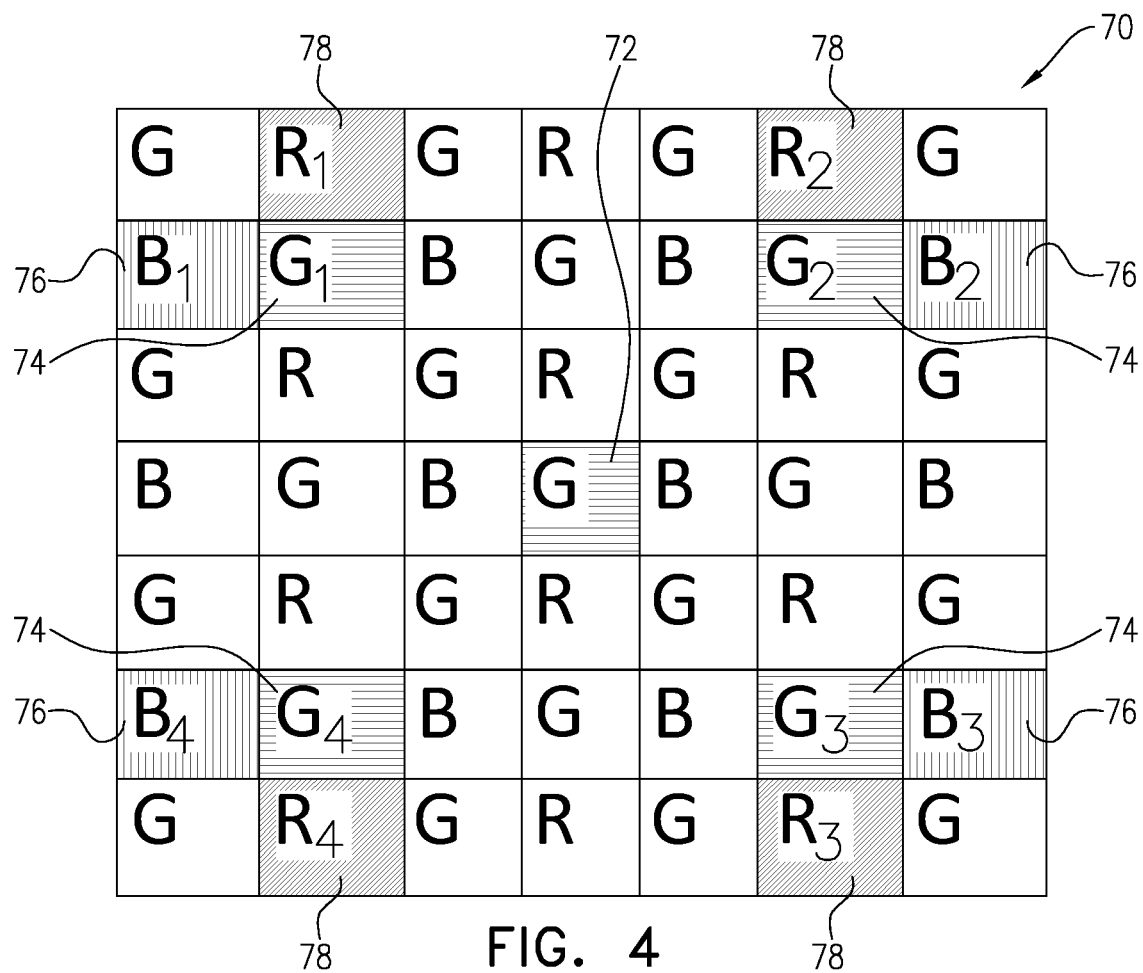
FIG. 4 is a schematic representation of a mask applied in detecting vertex points of a machine-readable tag in a mosaic image, in accordance with an embodiment of the invention.

FIG. 4 is a schematic representation of a mask 70 that can be applied by processor 32 in detecting CVPs in this manner, in accordance with an embodiment of the invention. In this example, mask 70 is centered on a green pixel 72, and D=2. Processor 32 reads the values of green pixels 74 (labeled $G_1, \ldots, G_4$) at the four probe locations surrounding pixel 72, together with blue pixels 76 ($B_1, \ldots, B_4$) and red pixels 78 ($R_1, \ldots, R_4$) at the locations adjoining pixels 74 that are farther displaced from central green pixel 72. (Alternatively, processor 32 could use the blue and red pixels that are closer to the central green pixel.) Application of this mask 70 to the mosaic image enables processor 32 to probe the image for CVPs with effectively finer resolution than could be achieved after processing by ISP 42.

Returning now to FIG. 3, processor 32 applies the pixel values included in mask 70 for each central pixel 72 in order to identify CVPs in the mosaic image, at a CVP identification step 64. For example, processor 32 may compute the minimal and maximal values of the pixels of each different color in mask 70:

$$I_{red}^{min}=\min_i \{I(R_i)\}; I_{green}^{min}=\min_i \{I(G_i)\}, I_{blue}^{min}=\min_i \{I(B_i)\}$$

$$I_{red}^{max}=\max_i \{I(R_i)\}; I_{green}^{max}=\max_i \{I(G_i)\}; I_{blue}^{max}=\max_i \{I(B_i)\}$$

Candidate CVPs will be characterized by differences between the maximal and minimal values that are greater than a certain threshold, as well as by the combination of R, G and B values at each probe location being substantially different from those at the other probe locations. These candidate CVPs can be identified and then decoded, for example, using the method shown in the above-mentioned PCT International Publication WO 2013/182963 in FIG. 8 and described on pages 13-15 of the specification.

Processor 32 saves the candidate CVP locations that meet these criteria, while discarding the remaining locations that have been tested. Because of the fine resolution of CVP identification, multiple candidate CVP locations may be identified in this manner around the actual location of the CVP in the image captured by camera module 30. In this case, processor 32 may cluster together the adjacent candidate locations and fix the CVP at the center of the cluster, for example.

Once the CVPs have been identified at step 64, processor 32 reads and processes the color data at the pixels surrounding each CVP in order to assign a color value to each color element. Processor 32 then processes the colors in order to decode the graphical tag, at a code extraction step 66.

Figure 5:
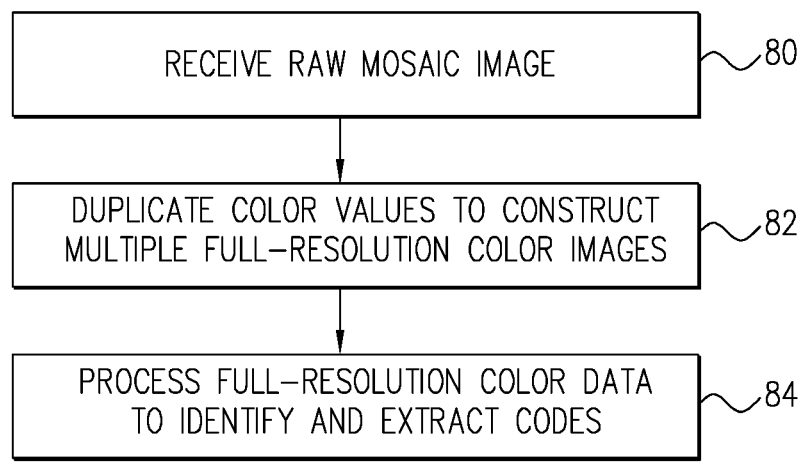
FIG. 5 is a flow chart, which schematically illustrates a method for detecting and decoding machine-readable tags using a mosaic image sensor, in accordance with yet another embodiment of the invention.

FIG. 5 is a flow chart, which schematically illustrates a method for detecting and decoding machine-readable tags using mosaic image sensor 38, in accordance with yet another embodiment of the invention. In this embodiment, processor 32 creates one or more enhanced mosaic images by replicating the pixels in each of the sub-matrices in the original mosaic image to neighboring locations, and then processes this enhanced mosaic image or images in order to identify and decode the graphical tag. By virtue of this pixel replication, the enhanced mosaic images have R, G and B color values at each pixel (rather than just a single color value as in the original mosaic image output by the image sensor), without the loss of resolution that results from the conventional demosaicking process carried out by ISP 42. Processor 32 may create and process a single enhanced image of this sort or, for improved precision, multiple enhanced images based on different pixel replication schemes. This approach makes maximal use of the information content of the original mosaic image in order to identify tags with the highest possible resolution, though at the cost of increased computational complexity.

As in the preceding embodiments, the method of FIG. 5 is initiated when processor 32 receives a raw mosaic output image from image sensor 38, at an input step 80. Processor 32 produces multiple different enhanced mosaic images by replicating the pixel values in each of the sub-matrices to different neighboring locations in each of the different enhanced mosaic images, at a color value duplication step 82. These enhanced images each have a different pixel replication scheme and thus have different RGB values at each pixel. For example, assuming processor 32 produces four different enhanced images, as described below, the enhanced images will have respective pixel values $\{RGB_1\}$, $\{RGB_2\}$, $\{RGB_3\}$ and $\{RGB_4\}$.

Processor 32 uses the enhanced, full-resolution images in identifying and decoding graphical tags in the mosaic images that are output by image sensor 40, at a tag identification step 84. Typically, processor 32 processes all of the different enhanced mosaic images together at this step. For example, assuming the tags to have CVPs as in the preceding embodiment, processor 32 extracts the maximal and minimal pixel color values at the locations surrounding each potential CVP as follows:

$$I_{red}^{min}=\min_i\{I_{red}(RGB_i)\}; I_{green}^{min}=\min_i\{I_{green}(RGB_i)\}; I_{blue}^{min}=\min_i\{I_{blue}(RGB_i)\}; \text{ and}$$

$$I_{red}^{max}=\max_i\{I_{red}(RGB_i)\}; I_{green}^{max}=\max_i\{I_{green}(RGB_i)\}; I_{blue}^{max}=\max_i\{I_{blue}(RGB_i)\};$$

The processor then applies these values in the manner described above in reference to FIGS. 3 and 4.

Figure 6A:
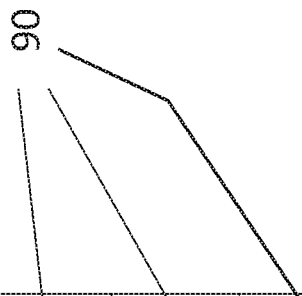
FIG. 6A is a schematic representation of a part of a mosaic image that is output by a mosaic image sensor.

FIGS. 6A-6E schematically illustrate the process of pixel replication that is described above, in accordance with an embodiment of the invention. FIG. 6A is a schematic representation of a part of a mosaic image 88 that is output by image sensor 38, while FIGS. 6B-6E are schematic representations of RGB images that are produced based on this mosaic image.

Mosaic image 88 comprises pixels 90 (including only 7×7 pixels for the sake of simplicity) in a Bayer mosaic pattern, with subscript indices indicating row and column numbers. The green pixels in the odd-numbered rows, interleaved with red pixels in the same rows, are referred to as "$G_{red}$" pixels, while those in the even-numbered rows are referred to as "$G_{blue}$" pixels. A different pixel replication scheme is used in producing the RGB images in each of FIGS. 6B-6E, as follows:

FIG. 6B (PIXEL VALUES 92):

| Pixel type | Red value | Green value | Blue value |
|---|---|---|---|
| R | Existing | Left pixel | Left & Above pixel |
| B | Left & Above pixel | Left pixel | Existing |
| $G_{red}$ | Left pixel | Existing | Above pixel |
| $G_{blue}$ | Above pixel | Existing | Left pixel |

FIG. 6C (PIXEL VALUES 94):

| Pixel type | Red value | Green value | Blue value |
|---|---|---|---|
| R | Existing | Right pixel | Right & Above pixel |
| B | Right & Above pixel | Right pixel | Existing |
| $G_{red}$ | Right pixel | Existing | Above pixel |
| $G_{blue}$ | Above pixel | Existing | Right pixel |

FIG. 6D (PIXEL VALUES 96):

| Pixel type | Red value | Green value | Blue value |
|---|---|---|---|
| R | Existing | Right pixel | Right & Below pixel |
| B | Right & Below pixel | Right pixel | Existing |
| $G_{red}$ | Right pixel | Existing | Below pixel |
| $G_{blue}$ | Below pixel | Existing | Right pixel |

FIG. 6E (PIXEL VALUES 98):

| Pixel type | Red value | Green value | Blue value |
|---|---|---|---|
| R | Existing | Left pixel | Left & Below pixel |
| B | Left & Below pixel | Left pixel | Existing |
| $G_{red}$ | Left pixel | Existing | Below pixel |
| $G_{blue}$ | Below pixel | Existing | Left pixel |

These pixel duplication schemes are presented by way of example, and alternative schemes of this sort are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Imaging apparatus, comprising:
    a mosaic image sensor, which is configured to capture and output a mosaic image comprising a matrix of pixels that is made up of multiple interleaved sub-matrices, each sub-matrix containing the pixels of a single respective color; and
    processing circuitry, which is configured to process the pixels in each of one or more of the sub-matrices separately from the pixels in the other sub-matrices in order to identify in the mosaic image a graphical tag that encodes a digital value in a machine-readable form.

2. The apparatus according to claim 1, wherein the sub-matrices comprise red, green and blue sub-matrices.

3. The apparatus according to claim 1, wherein the processing circuitry is configured to identify, in the one or more of the sub-matrices, one or more candidate areas of the mosaic image that satisfy a predefined criterion for containing the graphical tag, and to apply a tag decoding process to the candidate areas in the mosaic image.

4. The apparatus according to claim 3, wherein the processing circuitry is configured to compute a variance of the pixels in each of the one or more of the sub-matrices, and to identify one or more windows within the mosaic image in which the computed variance satisfies a predefined criterion as the candidate areas.

5. The apparatus according to claim 4, wherein the graphical tag comprises a monochromatic pattern, and the processing circuitry is configured, based on the pixels in each of the sub-matrices within each of the one or more windows, to select a respective binarization threshold for the pixels in each sub-matrix within each window, and to binarize the pixels using the respective binarization threshold and process the binarized pixels from the multiple sub-matrices in order to decode the graphical tag.

6. The apparatus according to claim 3, wherein the graphical tag comprises a plurality of color elements of different respective colors, which meet at one or more color vertex points, and wherein the processing circuitry is configured to identify the one or more candidate areas by finding respective locations of the color vertex points in the mosaic image.

7. The apparatus according to claim 6, wherein the processing circuitry is configured to find the respective locations of the color vertex points by making a comparison of maximal and minimal values of the pixels in each of the one or more of the sub-matrices at a predefined set of probe positions surrounding each of a set of candidate locations in the mosaic image, and to identify the color vertex points among the candidate locations responsively to the comparison.

8. The apparatus according to claim 1, wherein the processing circuitry is configured to produce at least one enhanced mosaic image by replicating the pixels in each of the sub-matrices to neighboring locations within the matrix of pixels, and to identify and decode the graphical tag by processing the at least one enhanced mosaic image.

9. The apparatus according to claim 8, wherein the at least one enhanced mosaic images comprises a plurality of different enhanced mosaic images, which are produced by replicating the pixels in each of the sub-matrices to different neighboring locations in each of the different enhanced mosaic images, and wherein the processing circuitry is configured to identify and decode the graphical tag by processing all of the different enhanced mosaic images.

10. The apparatus according to claim 1, and comprising a display, wherein the processing circuitry comprises an image signal processor, which is configured to generate an output image for presentation on the display by combining the pixels in the multiple interleaved sub-matrices in order to compute luminance and chrominance values over the output image.

11. A method for image processing, comprising:
receiving from a mosaic image sensor a mosaic image comprising a matrix of pixels that is made up of multiple interleaved sub-matrices, each sub-matrix containing the pixels of a single respective color; and
processing the pixels in each of one or more of the sub-matrices separately from the pixels in the other sub-matrices in order to identify in the mosaic image a graphical tag that encodes a digital value in a machine-readable form.

12. The method according to claim 11, wherein the sub-matrices comprise red, green and blue sub-matrices.

13. The method according to claim 11, wherein processing the pixels comprises identifying, in the one or more of the sub-matrices, one or more candidate areas of the mosaic image that satisfy a predefined criterion for containing the graphical tag, and applying a tag decoding process to the candidate areas in the mosaic image.

14. The method according to claim 13, wherein identifying the one or more candidate areas comprises computing a variance of the pixels in each of the one or more of the sub-matrices, and identifying one or more windows within the mosaic image in which the computed variance satisfies a predefined criterion as the candidate areas.

15. The method according to claim 14, wherein the graphical tag comprises a monochromatic pattern, and applying the tag decoding process comprises selecting, based on the pixels in each of the sub-matrices within each of the one or more windows, a respective binarization threshold for the pixels in each sub-matrix within each window, and binarizing the pixels using the respective binarization threshold and processing the binarized pixels from the multiple sub-matrices in order to decode the graphical tag.

16. The method according to claim 13, wherein the graphical tag comprises a plurality of color elements of different respective colors, which meet at one or more color vertex points, and wherein identifying the one or more candidate areas comprises finding respective locations of the color vertex points in the mosaic image.

17. The method according to claim 16, wherein finding the respective locations of the color vertex points comprises making a comparison of maximal and minimal values of the pixels in each of the one or more of the sub-matrices at a predefined set of probe positions surrounding each of a set of candidate locations in the mosaic image, and identifying the color vertex points among the candidate locations responsively to the comparison.

18. The method according to claim 11, wherein processing the pixels comprises producing at least one enhanced mosaic image by replicating the pixels in each of the sub-matrices to neighboring locations within the matrix of pixels, and identifying and decoding the graphical tag by processing the at least one enhanced mosaic image.

19. The method according to claim 18, wherein producing the at least one enhanced mosaic images comprises producing a plurality of different enhanced mosaic images by replicating the pixels in each of the sub-matrices to different neighboring locations in each of the different enhanced mosaic images, and wherein identifying and decoding the graphical tag comprises processing all of the different enhanced mosaic images.

20. The apparatus according to claim 1 and comprising applying an image signal processor to generate an output image for presentation on a display by combining the pixels in the multiple interleaved sub-matrices in order to compute luminance and chrominance values over the output image.

21. A computer software product, comprising a non-transitory computer-readable medium in which program instructions are stored, which instructions, when read by a processor, cause the processor to receive from a mosaic image sensor a mosaic image comprising a matrix of pixels that is made up of multiple interleaved sub-matrices, each sub-matrix containing the pixels of a single respective color, and to process the pixels in each of one or more of the sub-matrices separately from the pixels in the other sub-matrices in order to identify in the mosaic image a graphical tag that encodes a digital value in a machine-readable form.

* * * * *